Figure 1:
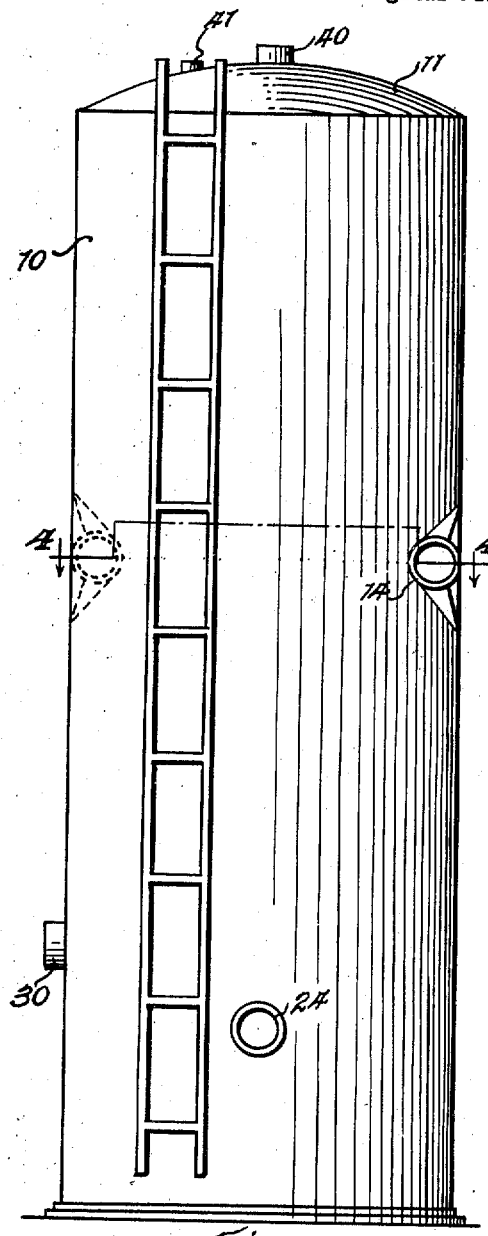

Feb. 24, 1931. J. P. WALKER Re. 17,983

OIL AND GAS SEPARATOR

Original Filed March 15, 1927 2 Sheets-Sheet 1

J. P. Walker,
INVENTOR
BY John A. Ashley
ATTORNEY

Feb. 24, 1931. J. P. WALKER Re. 17,983

OIL AND GAS SEPARATOR

Original Filed March 15, 1927 2 Sheets-Sheet 2

J. P. Walker.
INVENTOR
BY Jack Ashley
ATTORNEY

Reissued Feb. 24, 1931

Re. 17,983

UNITED STATES PATENT OFFICE

JAY P. WALKER, OF TULSA, OKLAHOMA, ASSIGNOR OF FORTY PER CENT TO GUY O. MARCHANT AND SIX PER CENT TO C. G. WELLS, OF TULSA, OKLAHOMA

OIL AND GAS SEPARATOR

Original No. 1,661,685, dated March 6, 1928, Serial No. 175,445, filed March 15, 1927. Application for reissue filed July 26, 1929. Serial No. 381,345.

This invention relates to new and useful improvements in oil and gas separators.

The object of the invention is to provide improved means for effecting a separation of oil and gas either under a low pressure or under a high pressure and to provide new improved apparatus for this purpose.

A particular object of the invention is to provide a tank provided with oil and gas inlets which latter are arranged so as to convert a stream of fluid from a pipe into a tangentially directed spray having its greatest dimension in a vertical plane contiguous to the inner surface of the wall of the tank, thereby effecting the initial or first step in the separation of the oil and gas, due to the oil being heavier than the gas and tending to fall to the bottom of the spray and thus being started on a downward helical course within the tank.

A further object of the invention is to provide a shell within the tank having openings well above the inlets so that the gas and oil vapors which rise from the spray may enter said shell, which is equipped with means for scrubbing the fluid and further separating the oil and gas, as well as increasing the velocity of the fluid, whereby centrifugal action is utilized in scrubbing and separating.

Another object of the invention is to provide a vertical separating cylinder within the shell having its bottom formed into an oil collecting trough and provided with inlets near its bottom and below the inlets to the shell, for retarding the escape of the gas and for prolonging the scrubbing and centrifugal action within the shell.

A still further object of the invention is to provide means at the entrance of the cylinder for deflecting oil therefrom; together with a vertical deflector within the cylinder opposite the entrance openings thereof for further scrubbing the fluids.

An important object of the invention is the provision of oil draining conductors for the shell, the deflectors and the baffles, having their discharge ends located below the normal gas space within the tank.

Still another object of the invention is to provide means at the bottom of the tank for checking the whirling motion of the oil so that the sand and sediment will settle to the bottom of the tank.

A construction designed to carry out the invention will be hereinafter described, together with other features of the invention.

Figure 2:
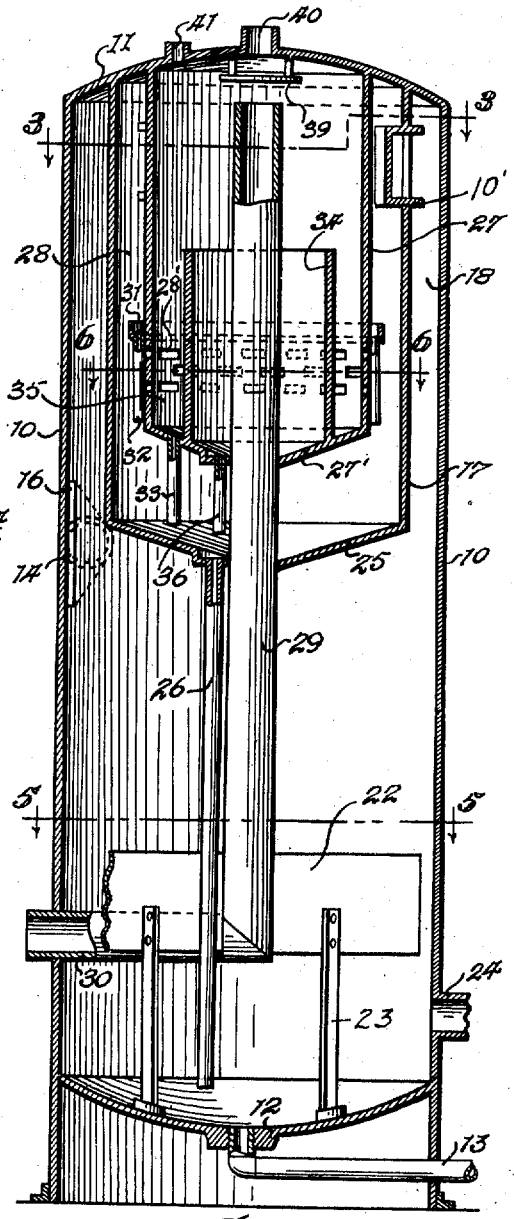
Figure 3:
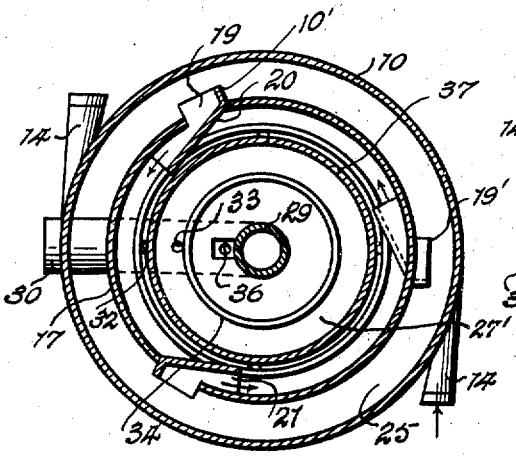
Figure 4:
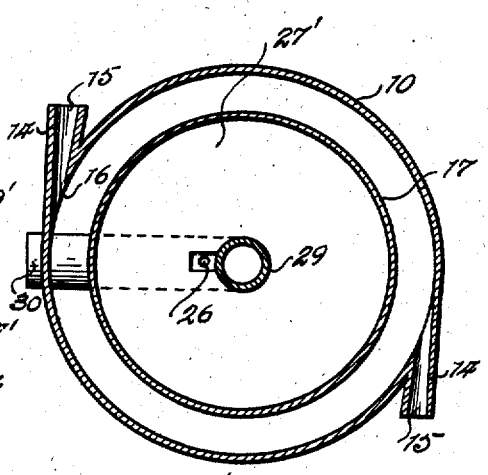
Figure 5:
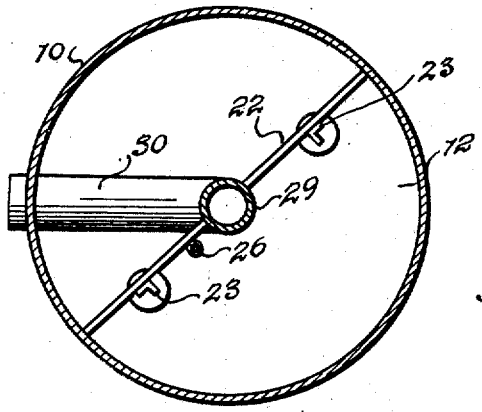
Figure 6:
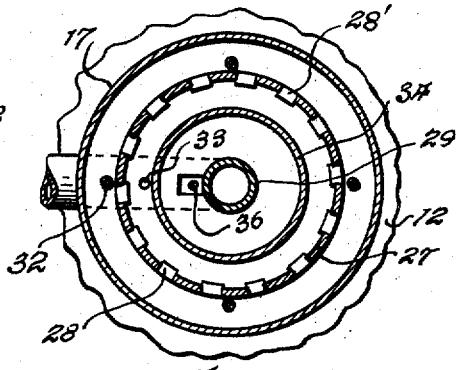

The invention will be more readily understood from a reading of the following specification and by reference to the accompanying drawings, in which an example of the invention is shown and wherein:

Figure 1 is an elevation of a separator constructed in accordance with my invention, Figure 2 is a vertical sectional view of the same, Figure 3 is a horizontal cross-sectional view taken on the line 3—3 of Figure 2, Figure 4 is a horizontal cross-sectional view taken on the line 4—4 of Figure 1, Figure 5 is a similar view taken on the line 5—5 of Figure 2, and Figure 6 is a horizontal cross-sectional view taken on the line 6—6 of Figure 2, and omitting the vertical deflector.

In the drawings the numeral 10 designates an upright cylindrical tank having a crowned top 11 and a dished bottom 12 elevated sufficiently for the connection of a drain pipe 13 thereunder. This may be equipped with a suitable cutoff valve [not shown]. At the central portion of the tank I provide equidistant inlet nozzles 14 for connecting with the pipes which supply the oil and gas to be separated. These nozzles are welded into the side of the tank, or otherwise suitably secured, and each nozzle is flared vertically and reduced longitudinally so that it is made cylindrical at its outer end 15 for connecting with the supply pipe, while its inner or discharge end is converted into a narrow rectangular opening 16 disposed vertically of the tank.

Each nozzle is disposed substantially tangentially to the cylindrical wall of the tank with the result that the stream of fluid received from the supply pipe is converted into a vertical spray or sheet directed circumferentially within the tank. The oil being heavier than the gas and the opening being vertically elongated, it is obvious that the oil will tend to settle to the bottom of each nozzle as it passes therethrough, and thus as it enters the tank, the oil will tend to segregate into the lower portion of the spray and will be started around the tank in a slightly downward helical course, while the gaseous fluids will tend to rise in the nozzles and the sprays and will thus be started around the tank in a slightly upward helical course. The foregoing will produce the first or initial step in the separation.

A cylindrical shell 17 is concentrically mounted within the tank, having its upper end suitably fastened to the top 11. The shell is spaced sufficiently from the wall of the tank to provide an annular channel 18 into which the oil and gas is introduced and circulated. At its upper end the shell is provided with vertical inlet openings 19 located in its side wall. Within the shell are arranged a plurality of equally spaced deflectors 20 which have portions 21 extending inwardly beyond the side edges of the openings 19. Outwardly directed flanges 10′ are fastened around three sides of the openings 19, so that the fluids in passing around the shell and entering the openings 19 must deflect outwardly and around the edges of the flanges in order to enter said openings. This will divert oil running down the outside of the shell and prevent it entering the shell.

The gas and oil vapors from the sprays follow their helical course upwardly in the channel 18 and enter the shell through the openings 19, while the separated oil flows downwardly in the tank to the bottom thereof. In order to check the centrifugal motion of the oil at the bottom of the tank, I provide a diametrical upright baffle 22 supported on legs 23 secured to the bottom 12. This checking of the whirling motion of the oil will cause the sand and sediment to settle to the bottom 12 and below an outlet pipe 24, through which the oil is conducted from the tank.

The fluid which enters through the openings 19 is somewhat retarded in its flow by the deflectors 20 and the extensions 21, whereby the velocity of the fluid is increased and a scrubbing action is started. The extensions 21 direct the fluid circumferentially within the shell and the scrubbing action coupled with the centrifugal motion of the fluid causes a further separation of the oil and gaseous fluids.

The oil which passes down the inner walls of the shell, together with any other oil or heavy particles falling in the shell, is caught in an inclined trough 25, which closes the bottom of the shell. A drain pipe 26 leads from the trough to the lower portion of the tank. It is important that the drain pipe 26 extend below the oil level in the tank, otherwise gas might rise therein and interfere with the separation in the shell 17 and cylinder 27. It will be noted that the openings 16 in the side walls of the tank 10 extend below the bottom edge of the shell 17 and thus the gaseous fluid entering through said openings are given a full opportunity to freely expand into the unobstructed space below the said shell, whereby the heavier particles of oil precipitate toward the bottom of the tank. The gaseous fluids do not lose their directed courses.

A separating cylinder 27 depends from the top 11 concentrically within the shell. This cylinder has its upper end suitably fastened to the top while its lower end is closed by a hopper bottom trough 27′. The cylinder is somewhat less in diameter than the shell so as to provide an annular space 28 therebetween, similar to the channel 18. The fluid which is discharged from the deflectors 20 is directed into the space 28 and carried therearound. Before the gaseous fluid can escape, it must pass downward in the space 28. A short distance above the lower end of the cylinder are several rows of staggered holes 28′ which are punched so as to form burrs on the inside which will deflect oil running down inside of the cylinder and prevent its admixture with the gas entering said holes. An annular trough 31 surrounds the cylinder above the holes and drain pipes 32 lead therefrom.

A central gas escape pipe 29 extends from a point within the upper end of the cylinder down through the troughs 27′ and 25 to a horizontal pipe 30 extending through the side of the tank between the bottom 12 and the baffle 22. In order to accommodate the pipe 29, the trough 25 is so formed that its drain pipe 26 may be positioned to one side of the central pipe 29. The trough 27′ is similarly formed and a drain pipe 33 leads therefrom to the trough 25.

Within the cylinder 27 a vertical cylindrical deflector 34 is concentrically mounted around the pipe 29 on the trough 27′. The deflector is open at its top and extends about half way the height of the cylinder 27 and well above the holes 28′. An annular space or channel 35 is formed between the cylinder and the deflector. The gaseous fluids entering through the holes 28′ contact with the vertical walls of the deflector, thus scrubbing out the oil which runs down the deflector to the trough 27′. Oil lodging in the deflector is caught in the deflector and escapes through a drain pipe 36.

The pipe 29 has its upper end open and a short distance below the top 11. A circular deflector plate 39 is suspended from the top 11 above the open end of the pipe so that the gaseous fluids in entering said pipe are caused to make a sharp turn, whereby a final separation of oil and gas properties is carried out. A normally closed outlet 40 in the top 11 over the deflector 39 may be opened for the purpose of taking off gas samples. A connection 41 [Fig. 1] may be included in the top 11 for the purpose of connecting a safety device.

It is pointed out, that the gaseous fluid which rises in the channel 18, after the initial separation of the oil and gas entering through the nozzle 14, must flow to the top of said channel before escaping into the shell 17. In making this ascent, the fluid takes a helical course and an opportunity is thus given for the precipitation of liquids and solids, which will fall to the bottom of the tank. The gaseous fluid upon entering the deflectors 20 is subjected to a reduction in pressure, whereby the circumferentially directed fluid passes around the space 28 under an increased velocity. The fluid must pass downward and then into the cylinder 27, which causes a further separation. The flanges 10′ around the holes 19, the trough 31 and burred openings 28′ all act to rob the gaseous fluid of oil which is conducted to the bottom of the tank. The deflector 34 co-acting with the deflector 39 effect a final scrubbing and separation before the gases pass into the pipe 29.

It will be seen that all vertical walls within the shell 17, the cylinder 27, and the deflector 34, are drained and the liquids conducted directly to the trough 25 or by the pipes 33 and 36 and then through the pipe 26 to the bottom of the tank.

In connection with the operation of the apparatus it is pointed out that the influent upon entering the nozzles 14 from the well pipes [not shown] is permitted to expand or fan in a vertical direction, whereby the heavier properties tend to gravitate to the bottom of the nozzle; while the lighter or gaseous properties seek the upper portion of each nozzle. Thus before the enfluent is discharged through the restricted opening 16 an initial separation, induced by gravity, has taken place.

While there is some expansion in the nozzles the major expansion takes place in the tank upon the entrance of the influent. The influent upon entering the tank takes a helical course, being spread upon the inner wall of the tank and directed tangentially therearound.

This expansion into the full area of the tank is very important as it permits the heavier liquids and solids to take a downward helical course, which owing to its length of travel permits the entrained gaseous fluids to free themselves before reaching the oil level in the tank.

The theory of separation is based on the fact that by the time the influent reaches the oil level the lighter constituents or gaseous fluids will have been released and, therefore, there will be practically no gases rising from the stored oil. The initial expansion of the influent in the nozzles and the further expansion within the tank, together with the tangential direction of the influent on the inner wall of the tank, will cause the lighter fluids to take a helical course upwardly in the tank and into the annular space 18.

Upon entering this space the gaseous fluids upon contacting with the wall of the tank and the outer surface of the shell 17, will be scrubbed, whereby some of the liquids will be removed. Before the vapors or gaseous fluids can enter the space 28 they must climb around the outwardly directed flanges 19′ which surround the openings 19, whereby further moisture will be extracted.

The fluids upon passing through the openings 19 are directed tangentially in the space 28 by the deflectors 20. Within this space the gaseous fluids are again expanded and caused to take a downward helical course. Owing to the expansion and the scrubbing action entrained moisture is extracted from the fluids. Liquids passing down the shell 17 are caught in the trough 25 and liquids passing down the cylinder 27 are caught in the trough 31. When the fluids reach the openings 28′ their direction of flow is changed to a straight horizontal path so that upon passing through said opening they strike against the deflector cylinder 34. The fluids in passing through the openings 28 are again subject to a reduction in pressure and thus upon entering the cylinder 27 again expand, whereby entrained liquids are liberated.

The gaseous fluids are now permitted to rise within the cylinder 27 and are given a final scrubbing. Only those fluids which reach the top of the pipe 29 can enter and to escape they must first climb over the edge of the pipe 29 or strike the deflector 39 before entering said pipe. After going through the various stages of expansion all of the solid and liquid particles will be removed from the fluid when it enters the pipe 29. It is to be noted that the lighter properties upon starting upward in the space 18 pursue a progressive path and are not taken through other fluids or vapors; but the length of the path, before escaping, and the numerous scrubbing and expansion operations are sufficient to extract substantially all moisture.

It will be understood that the influent which enters the tank from the nozzle 14 is not a solid liquid, but is an admixture of gas and oil, thus being partly gaseous and partly liquid. The gaseous fluids which pass through the upper portion of the tank are commonly referred to as a mist. The gaseous fluids whirling around in the chamber 28 will be in the form of a mist and the cylinder 27 with its holes 28′ acts as a mist extractor because it tends to remove the moisture or liquids from the gaseous fluid.

Various changes in the size and scope of the different parts, as well as modifications and alterations, may be made within the scope of the appended claims.

What I claim is:

1. In an oil and gas separator, an upright tank, fluid inlets in the sides of the tank, a shell within the tank spaced from the tank walls, fluid inlets at the upper end of the shell above the tank inlets, a separating cylinder in the shell having its upper portion closed and provided with a fluid inlet communicating with the shell, a gas escape pipe leading from the upper portion of the cylinder, and an oil outlet leading from the lower end of the tank.

2. In an oil and gas separator, an upright tank, fluid inlets in the sides of the tank, a shell within the tank spaced from the tank walls, fluid inlets at the upper end of the shell above the tank inlets, a separating cylinder in the shell having its upper portion closed and provided with a fluid inlet communicating with the shell, a gas escape pipe leading from the upper portion of the cylinder, an oil outlet leading from the lower end of the tank, and a deflector located in the cylinder below the entrance end of the gas escape pipe.

3. In an oil gas separator, an upright tank, fluid inlets in the sides of the tank, a shell within the tank spaced from the tank walls, fluid inlets at the upper end of the shell above the tank inlets, a separating cylinder in the shell having its upper portion closed and provided with a fluid inlet communicating with the shell, a gas escape pipe leading from the upper portion of the cylinder, an oil outlet leading from the lower end of the tank, and drain conductors extending downwardly from the shell and cylinder.

4. In an oil and gas separator, an upright tank, fluid inlets in the sides of the tank, a shell within the tank spaced from the tank walls, fluid inlets at the upper end of the shell above the tank inlets, a separating cylinder in the shell having its upper portion closed and provided with a fluid inlet communicating with the shell, a gas escape pipe leading from the upper portion of the cylinder, an oil outlet leading from the lower end of the tank, a deflector located in the cylinder below the entrance end of the gas escape pipe, and drain conductors extending downwardly from the shell, cylinder and deflector.

5. In an oil and gas separator, an upright tank, fluid inlets in the sides of the tank, a shell within the tank spaced from the tank walls, fluid inlets at the upper end of the shell above the tank inlets, a separating cylinder in the shell having its upper portion closed and provided with a fluid inlet communicating with the shell, a gas escape pipe leading from the upper portion of the cylinder, an oil outlet leading from the lower end of the tank, and a horizontally disposed deflector over the upper end of the gas escape pipe.

6. In an oil and gas separator, an upright tank having a closed top, fluid inlets at the central portion of the tank having means and effecting an initial separation of the oil and gas, a shell depending within the upper portion of the tank, inlets at the upper portion of the shell having means for increasing the velocity of the fluid entering the shell from the tank, a separating cylinder depending from the top of the tank within the shell having its upper and lower ends closed to the shell and provided with holes at its lower portion open to the shell, a gas escape pipe leading from the upper portion of the cylinder, and an oil outlet leading from the bottom of the tank.

7. In an oil and gas separator, an upright tank having a closed top, fluid inlets at the central portion of the tank having means for effecting an initial separation of the oil and gas, a shell depending within the upper portion of the tank, inlets at the upper portion of the shell having means for increasing the velocity of the fluid entering the shell from the tank, a separating cylinder depending from the top of the tank within the shell having its upper and lower ends closed to the shell and provided with holes at its lower portion open to the shell, a gas escape pipe leading from the upper portion of the cylinder, an oil outlet leading from the bottom of the tank, and a deflector in the cylinder below the entrance end of the gas escape pipe and opposite the holes in the cylinder.

8. In an oil and gas separator, an upright tank having a closed top, fluid inlets at the central portion of the tank having means for effecting an initial separation of the oil and gas, a shell depending within the upper portion of the tank, inlets at the upper portion of the shell having means for increasing the velocity of the fluid entering the shell from the tank, a separating cylinder depending from the top of the tank within the shell having its upper and lower ends closed to the shell and provided with holes at its lower portion open to the shell, a gas escape pipe leading from the upper portion of the cylinder, an oil outlet leading from the bottom of the tank, and drain conductors extending downwardly from the shell and cylinder.

9. In an oil and gas separator, an upright tank having a closed top, fluid inlets at the central portion of the tank having means for effecting an initial separation of the oil and gas, a shell depending within the upper portion of the tank, inlets at the upper portion of the shell having means for increasing the velocity of the fluid entering the shell from the tank, a separating cylinder depending from the top of the tank within the shell having its upper and lower ends closed to the shell and provided with holes at its lower portion open to the shell, a gas escape pipe leading from the upper portion of the cylinder, an oil outlet leading from the bottom of the tank, a deflector in the cylinder below the entrance end of the gas escape pipe, and drain conductors extending downwardly from the shell, cylinder and deflector.

10. In an oil and gas separator, an upright tank having a closed top, fluid inlets at the central portion of the tank having means for effecting an initial separation of the oil and gas, a shell depending within the upper portion of the tank, inlets at the upper portion of the shell having means for increasing the velocity of the fluid entering the shell from the tank, a separating cylinder depending from the top of the tank within the shell having its upper and lower ends closed to the shell and provided with holes at its lower portion open to the shell, a gas escape pipe leading from the upper portion of the cylinder, an oil outlet leading from the bottom of the tank, and a liquid drain trough surrounding the cylinder above the inlet holes thereof.

11. In an oil and gas separator, an upright tank having a closed top, fluid inlets at the central portion of the tank having means for effecting an initial separation of the oil and gas, a shell depending within the upper portion of the tank, inlets at the upper portion of the shell having means for increasing the velocity of the fluid entering the shell from the tank, a separating cylinder depending from the top of the tank within the shell having its upper and lower ends closed to the shell and provided with holes at its lower portion open to the shell, a gas escape pipe leading from the upper portion of the cylinder, an oil outlet leading from the bottom of the tank, a liquid drain trough surrounding the cylinder above the inlet holes thereof, and a drain pipe leading from the trough.

12. In an oil and gas separator, an upright tank having a closed top, fluid inlets at the central portion of the tank having means for effecting an initial separation of the oil and gas, a shell depending within the upper portion of the tank, inlets at the upper portion of the shell having means for increasing the velocity of the fluid entering the shell from the tank, a separating cylinder depending from the top of the tank within the shell having its upper and lower ends closed to the shell and provided with holes at its lower portion open to the shell, a gas escape pipe leading from the upper portion of the cylinder, an oil outlet leading from the bottom of the tank, a deflector in the cylinder below the entrance end of the gas escape pipe and opposite the holes in the cylinder, liquid drain pipes leading from the cylinder and deflector, a drain trough surrounding the cylinder above the inlet holes thereof, and a drain conductor leading from the said trough.

13. In an oil and gas separator, an upright tank having fluid inlets, a separating cylinder located in the tank and having inlet holes at its lower portion, a circular trough surrounding the cylinder above the inlet holes thereof, and a drain leading from the trough.

14. In an oil and gas separator, the combination of an upright tank having a fluid inlet, a shell within the upper portion of the tank having a fluid inlet from the tank, a separating cylinder within the shell having a fluid inlet from the shell, a circular trough surrounding the cylinder, a drain conductor leading from the trough, and a gas escape leading from the cylinder.

15. In an oil and gas separator, the combination of an upright tank having a fluid inlet, a shell within the upper portion of the tank having a fluid inlet from the tank, a separating cylinder within the shell having a fluid inlet from the shell, a circular trough surrounding the cylinder, a drain conductor leading from the trough, a drain trough at the bottom of the shell, a drain pipe leading from the drain trough of the shell, and a gas escape leading from the cylinder.

16. In an oil and gas separator, an upright tank having tangentially disposed fluid inlets, a shell depending in the tank and having an imperforate lower portion substantially opposite said inlets and having circumferentially spaced inlet openings from the tank at its upper portion separated by imperforate portions of greater area, deflectors extending along the inner wall of the shell beyond said openings and discharging intermediate thereof in the direction of said fluid inlets and in a path parallel to said imperforate portion of the inner wall, a gas escape pipe leading from the shell, and an oil outlet at the bottom of the tank.

17. In an oil and gas separator, the combination of an upright tank having an oil inlet at substantially its midheight provided with means tangentially disposed to direct the oil circumferentially around the inner wall of the tank, an upright shell within the top of the tank substantially opposite said inlet and having a closed bottom and its side wall spaced from the tank to provide communication with the lower portion of the tank, said shell being formed with a fluid inlet from the tank at its upper portion, a gas outlet from said shell, and a vertical baffle extending transversely across the lower portion of the tank for stopping the circumferential movement of the downward flowing oil.

18. In an oil and gas separator, an upright tank having a restricted vertical opening in its side near its central portion, a nozzle flared vertically to register with said opening and mounted on the outside of the tank tangentially to the wall thereof, whereby the oil delivered by said nozzle will be directed circumferentially with a vertical spray within said tank and caused to flow helically down the wall of the tank while the oil laden gases will escape upwardly a closed shell depending from the top of the tank and having an imperforate wall extending upward from said nozzle and formed with inlets confined to its upper portion, and a gas escape conductor leading from the shell.

19. In an oil and gas separator, an upright tank, an influent inlet nozzle in the tank substantially its midheight, a shell within the tank closed at its lower end and spaced from the tank side to form an open passage communicating with the lower portion of the tank, inlets at the upper portion of the shell communicating with said space, oil collecting means disposed within the shell for impact with the oil laden gases entering the shell inlets, a gas outlet communicating with the interior of the shell, and an oil outlet from the lower portion of the tank.

20. In an oil and gas separator, an upright tank, vertically elongated fluid inlets tangentially disposed at the side of the tank at substantially its midheight to effect a primary separation, a shell within the tank above said inlets and having a closed bottom and imperforate side wall spaced from the tank to provide a passage for the free downward flow of oil, fluid inlets at the upper portion of the shell communicating with said passage, oil collecting means disposed within the shell for impact with oil laden gases entering the shell inlets, a gas outlet communicating with the interior of the shell, and an oil outlet from the lower portion of the tank.

21. In an oil and gas separator, an upright tank, an influent inlet nozzle in the tank arranged to direct said influent helically in said tank and located at such an elevation as to cause the downwardly flowing fluids to travel a path around the tank of sufficient length to permit the gaseous fluids to escape prior to reaching the oil level in the tank, the tank having a vertical annular scrubbing channel above the inlet through which the gaseous fluids travel in a helical path, the tank having a scrubbing chamber at the upper end closed to the tank except for openings at the upper end of said chamber for admitting the gaseous fluids only, means for draining extracted liquids from the scrubbing chamber to the lower end of the tank below the oil level, and means for carrying off gas from within said chamber.

22. In an oil and gas separator, an upright tank, an influent inlet nozzle spaced a substantial distance from the top and bottom of the tank and arranged to direct said influent helically within the tank, whereby the liquids are caused to settle in the tank, a restricted passage in the tank for conducting the lighter constituents of the influent upwardly, louvres on the inner wall of the passage at the upper portion of said passage open to the rising fluids, an expansion chamber into which said fluids are discharged from the louvres, means at the louvres whereby said fluids are caused to whirl circumferentially in said chamber, a gas outlet extending from the upper end of the tank, and baffling and scrubbing elements between which the fluids are caused to pass in their flow to said outlet.

23. In an oil and gas separator, an upright tank, an influent inlet nozzle at the mid-zone of the tank, whereby the liquids are caused to take a downward helical course and the lighter constituents rise from said inlet at mid-zone in said tank, means at the upper end of the tank for directing the lighter constituents of the influent circumferentially and further scrubbing out the liquids, and means for carrying off the gas from the upper central portion of the tank.

24. In an oil and gas separator, an upright tank, an influent nozzle at the mid-zone of the tank disposed to direct the influent circumferentially both upwardly and downwardly within the tank, whereby the influent is directed helically within the tank to settle the liquids and to cause the lighter constituents to rise to the upper portion of the tank, means at the upper end of the tank for diverting and directing the lighter constituents into a segregated downward helical path for further scrubbing out the liquids, and means for carrying off the gas from the upper central portion of the tank.

25. In an oil and gas separator, a tank, means for initially separating the lighter and heavier constituents of an oil and gas influent prior to entrance into said separating tank, and also for directing the influent helically within the tank both above and below the inlet, whereby the heavier fluids flow downwardly and the lighter fluids flow upwardly, means for collecting and scrubbing the up-flowing fluids to extract liquids therefrom, means for diverting the up-flowing fluids at the upper end of their travel, an expanding chamber into which said fluids are diverted, means for again expanding and scrubbing said fluids to extract liquids therefrom, and means for carrying off the gas.

26. In an oil and gas separator, a tank, inlet means at the side of the tank arranged to primarily segregate and direct the constituents of the influent and located at such an elevation on the tank as to cause the fluids to spread helically above and below the inlet means, said inlet means directing the heavier fluids downwardly and helically, whereby they are freed from the gaseous fluid prior to settling in the tank, said inlet means also directing the influent gaseous fluids upwardly and helically in the tank, whereby they are freed from liquids, inner and outer scrubbing chambers in the upper end of the tank having means for admitting and for downwardly diverting the upflowing gaseous fluids for extracting the liquids therefrom, means for conducting the extracted liquids to a point below the influent entrance, and means for carrying off the gas from the innermost scrubbing chamber.

27. In an oil and gas separator, a tank, means for primarily segregating the constituents of an influent and so directing said constituents upon entering the tank as to cause the fluids to spread helically above and below said means, whereby the heavier fluids are directed and caused to travel downwardly and to free the gaseous fluids prior to settling, said means also directing and causing the gaseous fluids to travel upwardly and helically and free heavier fluids during such travel, inner and outer separating chambers in the upper portion of the tank having inlets, means at the outer side of the outer chamber inlets for diverting the gaseous fluids into said chamber and directing said fluids circumferentially therein, whereby liquids are extracted therefrom, means for conducting the extracted liquids to a point below the oil level in the tank, and means for carrying off the gas from the innermost chamber.

28. In a fluid separator, a tank, a closed shell within the tank having a fluid inlet, means for draining liquids from the bottom of the shell, a gas escape pipe communicating with the shell, an upright baffle within the shell, and a mist extractor member surrounding the baffle opposite the inlet of the shell.

29. The method of separation which consists in primarily segregating the constituents of the influent at such an elevation within a container as to permit the fluids to spread helically above and below the inlet, whereby the heavier fluids travel downwardly and free the gaseous fluids prior to settling and also whereby the lighter or gaseous fluids travel upwardly and helically and free heavier fluids during such travel, then diverting said gaseous fluids into a downward helical path free from the preceding path and at an increased velocity for extracting liquids, then directing said gaseous fluids horizontally and abruptly arresting their passage for extracting additional liquids, and then carrying off the gas.

30. The method of separating oil and gas which consists in discharging an influent helically within a tank at such an elevation as to give the gaseous constituents an opportunity to rise from the downwardly flowing liquids before the latter settle in the tank, conducting the gaseous and lighter constituents of the influent helically and upwardly in a restricted passage for scrubbing out liquids, then discharging said constituents tangentially into an expansion chamber and whirling the same in said chamber for scrubbing out liquids, then changing the direction of flow of said constituents and baffling them to further scrub out liquids, and then carrying off the gas.

31. The method of separating oil and gas which consists in discharging an influent helically within a tank at such an elevation as to give the gaseous constituents an opportunity to rise from the downwardly flowing liquids before the latter settle in the tank, conducting the gaseous and lighter constituents of the influent upwardly in a restricted passage for scrubbing out liquids, then discharging said constituents tangentially into an expansion chamber and whirling the same downwardly to scrub out liquids, then diverting said constituents into a second expansion chamber and carrying them upwardly therein and also baffling them to scrub out liquids, and then carrying off the gas.

32. The method of separating oil and gas which consists in discharging an influent circumferentially within a tank at such an elevation as to give the gaseous constituent an opportunity to rise from the downwardly flowing liquids before the latter settle in the tank, conducting the gaseous and lighter constituents of the influent upwardly and helically in a restricted passage for scrubbing out liquids, further treating said constituents by whirling them to scrub out liquids, and then carrying off the gas.

33. In an oil and gas separator, an upright tank, an influent nozzle in the side of the tank for directing the influent circumferentially on the inner wall of the tank and located at such an elevation as to cause the heavier fluids to travel downwardly and the lighter fluids to travel upwardly, whereby gases are liberated from the heavier fluids prior to settling of the liquids in the bottom of the tank, a shell closed at its bottom and suspended in the tank and forming therewith a vertical annular restricted scrubbing chamber closed at its upper end, the shell having openings at its upper end for admitting the lighter fluids rising in the scrubbing chamber, means within the shell for causing the fluids to travel downwardly and then upwardly, and means for carrying off the gases from the upper end of the tank.

34. In an oil and gas separator, an upright tank, an inlet nozzle in the side of the tank constructed to introduce the influent circumferentially within the tank, a restricted annular scrubbing chamber above the nozzle for conducting the lighter fluids upwardly helically from the nozzle, means for whirling the fluids received from the chamber circumferentially within the upper portion of the tank, and means for carrying off the gas from the upper portion of the tank.

35. The method of separation which consists in primarily segregating and directing the constituents of an influent at such an elevation upon entering a container and above the liquid level therein as to cause the fluids to spread helically above and below the inlet, whereby the heavier fluids travel downwardly and free the gaseous fluids prior to settling, and also whereby the gaseous fluids travel upwardly and helically, conducting the gaseous fluids through a restricted channel during their upward helical travel and freeing them of heavier fluids during such upward travel, then diverting the gaseous fluids at the upper end of their helical travel and conducting them downwardly and upwardly through outer and inner chambers for extracting the liquids therefrom, then conducting the extracted liquids from the chambers, and then carrying off the gas from the top of the container.

36. The method of separation which consists in directing an influent circumferentially within a container at such an elevation above the liquid level therein as to cause the fluids to spread helically above and below the inlet, whereby the heavier fluids travel downwardly and free the gaseous fluids prior to settling, and also whereby the gaseous fluids travel upwardly and helically, conducting the gaseous fluids through a restricted channel during their upward helical travel and freeing them of heavier fluids during such travel, then diverting the gaseous fluids at the upper end of their helical travel, then conducting said gaseous fluids downwardly in a restricted channel through a comparatively long path, then conducting the gaseous fluids upwardly, carrying off the extracted liquids, and then carrying off the gas.

In testimony whereof I affix my signature.

JAY P. WALKER.